US011105680B2

(12) United States Patent
Guldimann et al.

(10) Patent No.: US 11,105,680 B2
(45) Date of Patent: Aug. 31, 2021

(54) WAVEGUIDE SPECTROMETER TO CARRY OUT THE INTEGRATED INTERFEROGRAM SCANNING

(71) Applicant: MICOS ENGINEERING GMBH, Dübendorf (CH)

(72) Inventors: Benedict Joseph Guldimann, VK Noordwijk (NL); Mohammadreza Madi, Birmenstorf (CH); Edoardo Alberti, Benglen (CH)

(73) Assignee: MICOS ENGINEERING GMBH, Dübendorf (CH)

( * ) Notice: Subject to any disclaimer, the term of this patent is extended or adjusted under 35 U.S.C. 154(b) by 213 days.

(21) Appl. No.: 16/317,969

(22) PCT Filed: Jul. 4, 2017

(86) PCT No.: PCT/EP2017/066671
§ 371 (c)(1),
(2) Date: Jan. 15, 2019

(87) PCT Pub. No.: WO2018/011023
PCT Pub. Date: Jan. 18, 2018

(65) Prior Publication Data
US 2020/0278248 A1    Sep. 3, 2020

(30) Foreign Application Priority Data

Jul. 15, 2016    (EP) .................................... 16179711

(51) Int. Cl.
*G01J 3/02*     (2006.01)
*G01J 3/28*     (2006.01)
*G01J 3/453*    (2006.01)

(52) U.S. Cl.
CPC ........... *G01J 3/0218* (2013.01); *G01J 3/0259* (2013.01); *G01J 3/2803* (2013.01); *G01J 3/4531* (2013.01)

(58) Field of Classification Search
CPC ...... G01J 3/0218; G01J 3/0259; G01J 3/2803; G01J 3/4531; G01J 3/0205; G01J 3/02; G01B 9/02; G02B 6/42
See application file for complete search history.

(56) References Cited

U.S. PATENT DOCUMENTS

| 4,211,911 A | 7/1980 | Dehn |
| 5,764,820 A | 6/1998 | DeDobbelaere |

(Continued)

FOREIGN PATENT DOCUMENTS

| CN | 1094817 A | 11/1994 |
| CN | 1107618 A | 8/1995 |

(Continued)

OTHER PUBLICATIONS

International Search Report dated Aug. 28, 2017 for PCT/EP2017/066784 filed Jul. 5, 2017.

(Continued)

*Primary Examiner* — Abdullahi Nur
(74) *Attorney, Agent, or Firm* — Paul D. Bianco; Gary S. Winer; Fleit Intellectual Property Law

(57) ABSTRACT

A waveguide spectrometer includes at least one substrate layer with at least one surface waveguide extending from an inlet face to guide the received light; at least one evanescent field sampler in the waveguide to out-couple light along the waveguide; at least one light sensing unit to detect the out-coupled light, each electrically connected to an electronic read out system; and means to achieve counter propagating optical signals inside the waveguide to obtain interference between the counter propagating optical signals (Continued)

generating an interference pattern along the waveguide. A compact and simple construction with improved spectral range/bandwidth of the spectrometer can be achieved with at least one modulator integrated into the sampling waveguide structure to enable conditioning of the guided optical signals and for changing the refractive index. The integrated modulator is realized by electrodes placed aside directly neighboured to the guiding core resp. waveguide generating an optical phases shift required for scanning the interferogram.

10 Claims, 5 Drawing Sheets

(56) References Cited

U.S. PATENT DOCUMENTS

| | | | |
|---|---|---|---|
| 6,300,638 | B1 | 10/2001 | Groger |
| 6,743,581 | B1 | 6/2004 | Vo-Dinh |
| 7,233,711 | B1 | 6/2007 | Beausoleil |
| 7,444,045 | B2 | 10/2008 | Fan et al. |
| 7,532,784 | B2 | 5/2009 | Tolshikhin et al. |
| 7,812,958 | B2 | 10/2010 | Le Coarer et al. |
| 2008/0007541 | A1 | 1/2008 | Eliasson |
| 2010/0090234 | A1 | 4/2010 | Cho et al. |
| 2015/0116720 | A1 | 4/2015 | Hadjar |
| 2018/0106671 | A1* | 4/2018 | Claes ............... G01B 9/02015 |
| 2019/0219445 | A1 | 7/2019 | Madi et al. |

FOREIGN PATENT DOCUMENTS

| | | |
|---|---|---|
| CN | 1867844 A | 11/2006 |
| CN | 101529292 A | 9/2009 |
| EP | 1825312 A1 | 8/2007 |
| WO | 2016/025727 A2 | 2/2016 |
| WO | 2018/11035 A1 | 1/2018 |

OTHER PUBLICATIONS

Written Opinion for PCT/EP2017/066784 filed Jul. 5, 2017.
Guldimann Benedikt et al: "Focal plane array spectrometer: miniaturization effort for space optical instruments", MOEMS and Miniaturized Systems X, SPIE, vol. 7930, No. 1, Feb. 10, 2011, 14 pages.
Etienne Le Coarer et al: "Wavelength-scale stationary-wave integrated Fourier-transform spectrometry", Nature Photonics, vol. 1, No. 8, Aug. 1, 2007, pp. 473-478.
English translation of International Preliminary Report on Patentability dated Jan. 15, 2019 and Written Opinion for PCT/EP2017/066784 filed Jul. 5, 2017.
International Search Report dated Oct. 19, 2017 for PCT/EP2017/066671 filed Apr. 7, 2017.
Written Opinion for PCT/EP2017/066671 filed Apr. 7, 2017.
M Pierre Benech et al: "Professeur des universités àGrenoble-INP PHELMA, Examinateur", Nov. 18, 2014 (Nov. 18, 2014), XP055336099, 226 pages.
Jerome Ferrand: "Étude et réalisation d'un spectromètre intégreà transformée de Fourier (SWIFTS)", 2010 XP055336339 Retrieved from the Internet: URL: https://tel/archives-ouvertes.fr/tel-00554948/file/Jerome_Ferrand_these_A4.pdf.
Thomas F et al: "First Results in Near and Mid IR Lithium Niobate-Based Integrated Optics Interferometer Based on SWIFTS—Lippmann Concept", Journal of Lightwave Technology, IEEE Service Center, New York, NY, US, vol. 32, No. 22, Nov. 15, 2014(Nov. 15, 2014), pp. 3736-3742.
R. Osellame et al: "Femtosecond laser microstructuring: an enabling tool for optofluidic lab-on-chips", Laser & Photonics Reviews, vol. 5, No. 3, May 2, 2011 (May 2, 2011), pp. 442-463.
International Preliminary Report on Patentability and Written Opinion for PCT/EP2017/066671 filed Jul. 4, 2017 (English translation).
Notice of Allowance dated Mar. 23, 2021 for U.S. Appl. No. 16/317,941 (19 pages).
Office action (with English translation) and search report (dated Aug. 28, 2020) for Chinese Patent Application No. 2017800568651.
Donghwan Ahn, Evanescent Coupling Device Design for Waveguide-Integrated Gropu IV Photodetectors, J of Lightwave Tech., vol. 28, No. 23, Dec. 1, 2010 (8 pages).
For U.S. Appl. No. 16/317,941: Office Action dated Sep. 11, 2020 (30 pages) Response to Office Action dated Jan. 11, 2021 (20 pages).
Eva Ryckeboar, CMOS compatible silicon nitride spectrometers for lab-on-a-chip spectral sensing, May 13, 2016 (9 pages).
Park, A hybrid AlGaInAs-silicon evanescent preamplifier and photodetector, 2007 (8 pages).
Rongjin Yan, Immunoassay demonstration using a locan evanescent array coupled biosensor, 2010 (8 pages).
Zgraggen, Optical properties of waveguide-coupled nanowires for sub-wavelength detectin in microspectrometer applications, 2015 J. Opt. 17 025801 (8 pages).

* cited by examiner

WAVEGUIDE SPECTROMETER TO CARRY OUT THE INTEGRATED INTERFEROGRAM SCANNING

TECHNICAL FIELD

The present invention relates to a Waveguide Spectrometer to carry out Integrated Interferogram Scanning Technique and Method to manufacture the Waveguide Spectrometer.

STATE OF THE ART

Spectroscopy is a general physical-analysis approach for investigating light-matter interactions. Current trends in the actual generation of imaging spectrometers are evidencing bifurcation path; from one side, with the increasing interest in the dedicated spectral regions for generating targeted products; and from the other side, with the growing interest in large spectral regions for general advance scientific purposes. The development effort for new generation of instruments, which satisfies the increased demand in accuracy, is notable. The upcoming systems are expected to have larger time coverage, more refined spatial resolution, and better radiometric performance. Additionally, miniaturization of the systems is highly demanded for all applications where mass, volume and consumed power are drivers for costs or application capability. Miniaturization of spectrometer systems is a milestone envisioned in the next 10-15 years, reducing mission/project costs, maximizing recurrent costs and allowing integration in micro-satellites for strategic missions. For space borne applications, a compact integrated spectrometer has a direct impact on the payload of the instrument. Moreover, monolithic integrated systems will reduce alignment requirements during integration and enhance stability during the instrument lifetime.

Spectroscopy from UV to IR with various and numerous instruments, already exist. Applications are dominated in many fields by single-pixel detector instruments. On the other hand, imaging spectrometers with contiguous bands and narrow spectral resolution (also branded commercially as "hyperspectral imagers") are used specifically for the purpose of measuring the spectral content of collected radiation, covering the imaging aspect of the spectral measurement. Dominating technology for imaging spectrometers covering spectral range between UV to SWIR for the time being are the dispersive instruments in push-broom mode, Imaging FTS systems are commercially operative mostly in the IR region and first space instrumentation (MTG-IRS instrument) is expected to become operational by 2018. However, it is important to mention that all these instruments, despite their high capabilities, are rather large and mass demanding. For example, Imaging spectrometers intended for very wide spectral ranges are best in terms of accuracy, if they designed based on all-mirror systems. This in turn leads to large, very massive, complex, and costly systems.

Investigation on miniaturized spectrometric devices is a worldwide effort actually, covered by a number of different approaches with ongoing studies at different research institutions. A NASA Goddard team for instance is working to demonstrate Miniaturized Spectrometer-on-a-Chip which, like the Composite Infrared Spectrometer (CIRS) on the board of Cassini Mission 1997, would be sensitive to mid-infrared bands (L. Keesey, "NASA's Goddard Space Flight Center, Greenbelt, Md.," 2012). The potential device is a greatly scaled down version of a Michelson-type FTS commonly used to study the spectra of planets and stars and identify their chemical makeup and other physical properties. To give an idea of the compactness of the new generation of FTS, it is enough to say that CIRS on the board of Cassini spacecraft is as big as a dishwashing machine, in spite the fact that it is powerful and has valuable discoveries. However, the discussed device under study at NASA Goddard would be capable of a measuring only a single pixel and its concept cannot be made upgradable to evolve into an imaging spectrometer.

At the Technical University of Delft scientists have investigated compact spectrometer configurations based on a dispersive principle, performing in the VIS NIR range and based on a single aluminum-coated glass wafer. They are acting as push-broom spectrometer but limited with respect to the market requests, limited spectral resolution (Semen Grabarnik, Arvin Emadi, Huaiwen Wu, Ger de Graaf, and Reinoud F. Wolffenbuttel, "High-resolution microspectrometer with an aberration-correcting planar grating," Appl. Opt. 47, 6442-6447 (2008)).

Companies as Imec (Heverlee, Belgium) started to commercialize a snapshot imaging spectrometer characterized by Fabry Perot filters arrays in front of the pixels of an imaging sensor. They are characterized by a rather large spectral FWHM (in the range of 5 to 15 nm). Moreover, this method is only applicable to push-broom spectrometer and to snapshot spectrometers applying processing techniques to artificially reconstruct the spectrum for each pixel and is currently limited to VIS NIR applications.

In 1891, at the Academie des Sciences in Paris, Gabriel Lippmann presented a beautiful colour photograph of the Sun's spectrum, obtained with his new photographic plate. Later, in 1894, he published an article on how his plate was able to record colour information in the depth of photographic grainless gelatin. He also explained how the same plate, after processing (development), could restore the original colour image merely through light reflection. He was thus the inventor of true interferential colour photography and received the Nobel Prize in 1908 for this breakthrough. Unfortunately, this principle was too complex to use. The method was abandoned a few years after its discovery, despite considerable investment by the Lumiére brothers.

One aspect of the Lippmann concept, which was ignored for long time, is related to spectroscopic applications. Within the context of enabling micro- and nanotechnology and miniaturization possibilities of spectroscopic equipment, it is nowadays of interest to revisit the Lippmann concept. Early in 1933, Ives proposed to use a photoelectric device to probe standing waves to make spectrometric measurements (H. E. Ives, "Standing light waves, repetition of an experiment by Wiener, using a photoelectric probe surface," J. Opt. Soc. Am., vol. 23, pp. 73-83, 1933).

More recently, in 1995, Connes proposed to use the emerging new technology of detectors for three-dimensional Lippmann-based spectrometry (P. Connes and E. Le Coarer, "3-D spectroscopy: The historical and logical viewpoint," IAU Colloquium, vol. 149, pp. 38-49, 1994). Following this, a first realization of a very compact spectrometer based on a MOEMS was reported by Knipp et al. in 2005, but it had a very limited spectral resolution. Based on the same concept, but taking advantage of photonics and near-field optics, Le Coarer et al. introduced in 2007 a kind of Stationary-Wave Integrated Fourier-Transform Spectrometry (SWIFTS) (E. Le Coarer, "Wavelength-scale stationary-wave integrated Fourier-transform spectrometry," Nature Photonics 1.8, pp. 473-478, 2007), in which direct sampling of evanescent standing waves is achieved using a collection of optical nanoprobes according to (E. Le Coarer, "SWIFTS: ON-CHIP VERY HIGH SPECTRAL RESOLUTION SPECTROMETER," in International Conference on Space Optics. Vol. 4, Rhodes, Greece, 2010) and EP 1 825 312 B1.

In the SWIFTS™ linear configuration, the stationary wave is created by a single-mode waveguide ended by a fixed mirror. The energy extraction required to sample the standing wave is obtained by sampling the evanescent wave on one side of the waveguide using nano-scattering dots located in the evanescent field. These nanodots, which are characterized by an optical index difference with the medium in which the evanescent field is located, scatter the light around an axis perpendicular to that of propagation within the waveguide. For each nanodot, the scattered light is detected by a pixel aligned with this axis. The intensity detected is thus proportional to the intensity of the waveguide at the exact location of the nanodot. A mathematical function known as a Lippmann transform—which is similar to a Fourier transform—takes into account all the calibration data and, when applied to the linear image, gives the spectrum of the light. In these configuration, the back reflecting element (a mirror) is fixed and no scanning possibility is introduced. Due to this, the commercialized SWIFTS spectrometer can be used in applications where signals have significantly long coherence length, for example for measuring unstable laser sources, fast characterization of multimode laser, and high-speed wavelength tuning of laser. However, there is still a significant discrepancy between these commercialized SWIFTS products and a proper miniaturized product for space/commercial applications. Another drawback of this configuration is that the inherent configuration allows to analyze spectral range of bandwidth limited by the Nyquist principle (generally 5 to 10 nm).

In the recent years, breakthrough core technologies applicable to spectroscopy have been published. In 2010, based on Lippmann and Gabor standing waves in waveguides a novel concept for spectroscopy, called "focal plane array spectrometer (FPAS)" has been introduced (G. B. and K. S., "Focal Plane Array Spectrometer: miniaturization effort for space optical instruments," Proc. of SPIE, vol. Vol 7930, pp. 01-14, 2010). The FPAS is a wideband imaging implementation of a stationary-wave integrated Fourier-transform spectrometer, targeting space borne applications. The advantage of FPAS over previous implementations is that, it allows to perform Fourier transform imaging spectroscopy within an extremely small volume and to expand the recollected spectral range of interest by means of an interferogram scanning principle. The FPAS, a highly integrated instrument concept, is based on a bi-dimensional array of waveguides, in which the light is injected at one bound. In each waveguide, the injected light in one end of the waveguide, is propagating along it, and is reflected by a mirror on the other bound of the waveguide. This generates a stationary (or standing wave) interference pattern. This standing wave pattern is sampled by means of evanescent field samplers, which are geometrically fixed on the waveguides and detectors. Like in a Fourier Transform Spectrometer, the spectral content of an observed scene is generating a specific interference pattern as standing wave, called the interferogram. In order to sample the interferogram, light is outcoupled on the top of the waveguide at distinct positions. The interferogram pattern (which is the generated by the forward and backward propagating collected light in the waveguide) sampled by the evanescent field samplers, is directed (e.g. by an image transfer optics) to the pixels of a matrix detector. In order to firstly expand the spectral bandwidth of the recollected spectrum and in order to collect the interferogram collection within the coherence length of the signal, a scanning mirror is adopted. The matrix detector transfers the collected light to electrical signal, and sends it to a processing unit (DSP or FPGA). Such a FPAS spectrometer may be assembled in small size, and form a compact package of single spectrometers. When this system is positioned in the focal plane of an objective, it will allow imaging spectrometry of the observed surface (objects).

FPAS is indeed a miniaturization concept for imaging spectrometers. However, its performance is specifically limited by the interferogram samplers which are geometrically fixed on the waveguides. The samplers cannot be placed at a spatial distance required by Nyquist criterion, otherwise the sub-micron distance between them would cause crosstalk between extracted data. The crosstalk is caused by retro reflections of guided modes and their propagation in the waveguide. Apart from that, the common detecting techniques requires either bulky optics for gathering sampled data from samplers or sophisticated electronics. These bottlenecks restrict the bandwidth of spectrometer device, due to the fact that in Lippmann or Gabor configuration the bandwidth is inversely proportional to the distance between interferogram samplers.

Moreover, in broadband applications, the signature of broadband spectral data appears as a sinc-envelope in the spatial domain (interferogram). The relevant information for the proper reconstruction of the spectrometer is contained within few micrometers (depending on the bandwidth) right after the reflective surface in the interferogram. In reality, the main lobe of this sinc-function which contains the broadband information has very short coherent length. Therefore, for broadband spectrum reconstruction, the sinc-envelope, especially the main-lobe of sinc-function must be retrieved during data acquisition. This requires the first interferogram sampler to be placed as close as possible to the reflective surface which is limited due to technological barriers.

So far none of the existing technologies have provided a solution to make miniaturized waveguide spectrometers appropriate for broadband applications. The commercialized devices based on SWIFTS concept suffer from limitations imposed by minimum distance between interferogram samplers yielding a narrow-band device only useful for single-pixel applications normally working in undersampling domain by violating Nyquist criterion.

With this regard, Osowiecki, Gaël D., et al. proposes to use a moving mirror as the reflecting surface for scanning the interferogram (Osowiecki, Gaël D., et al. "Standing wave integrated Fourier transform spectrometer for imaging spectrometry in the near infrared." SPIE Optical Engineering+Applications. International Society for Optics and Photonics, 2015). This solution of course provides more sampling points, but at the same time the moving mechanism has the disadvantage that it increases the complexity of the system, not appreciated in most of application specially spaceborne applications. Moreover, the main-lobe information is eventually lost in the gap between the moving mirror and the first interferogram sampler.

DESCRIPTION OF THE INVENTION

The object of the present invention is to provide a Waveguide Spectrometer with a fully integrated interferogram scanning technique with a compact and simple construction while improving the spectral range/bandwidth of the spectrometer.

According to the present invention, actuators, in particular electrodes, are placed, preferably on the top surface towards the front side of the substrate layer or on the opposing side faces resp. walls of the substrate layer, aside the guiding core resp. waveguide generating an optical phases shift required for scanning the interferogram.

Preferably, the electrodes can be placed for example by (electron beam) lithography techniques, sputter coating, two-photon lithography, bonding of patches or other means suitable to match the scale of the problem. Electrodes adhere to the substrate surface; an adhesion layer e.g. 5 nm thin titanium layer might be required before depositing e.g. gold electrodes.

The waveguide spectrometer according to the present application has the advantage that interferogram scanning can be applied integrated in the waveguide spectrometer without appending any additional building blocks (e.g. such as moving mirrors or additional external modulators) prior to the waveguide as known from the prior art.

The core of innovative solution is based on electro-optical effect/thermal effect in specific optical materials (e.g. Lithium Niobate $LiNbO_3$ crystals). In other words, according to the present invention, an electro-optic/thermal effect is achieved which allows to vary the refractive index of the waveguide where the interferogram is located. Moreover, according to the present invention, a Waveguide Spectrometer with a fully integrated interferogram scanning technique based on electro-optical effect, thermal effect or other effects in waveguide material is achieved realizing a broadband waveguide-based interferogram acquisition system suitable for applications in dynamic Fourier Transform spectrometers or others.

The solution according to the present invention is advantageously using integrated signal conditioning/modulation to achieve a sampling of an extended or even full range of the interferogram without the need of moving parts (such as mirrors). Furthermore, the invention targets the technical solution to move, or scan, the interferogram, which can have length of sub-millimeters to centimeters, inside the waveguide by an optical path length of few to a few tens of microns.

In a preferred embodiment of the present invention the waveguide spectrometer comprises non-conductive evanescent field samplers in the form of engraved diffusers such as photonic crystal light cones or etched grooves or electrically conductive metallic structures such as e.g. metallic nano samplers.

Since the applied electric field has side effects on scattering efficiency of conventional metallic samplers, the use of non-conductive samplers is preferred where the electro-optic effect is directly applied on the waveguide resp. guiding core if the samplers are located thereon.

The electrically conductive metallic structures building the evanescent field samplers may be optimized depending on the application specification (e.g. operation wavelength). They could be structured as plasmonic antennas in the shape of rods, as donuts or simple dots. The material for these metallic nanostructures depends on the optimization for the specific application, and is generally gold due to the several properties (chemical stability, spectral performance), however, other material such as silver, chrome, platinum are possible alternatives.

The fabrication of these metallic nanostructures can be e.g. through electron-beam lithography, sputter coating, two-photon lithography.

BRIEF DESCRIPTION OF THE DRAWINGS

A preferred exemplary embodiment of the subject matter of the invention is described below in conjunction with the attached drawings.

DESCRIPTION

Figure 1A:
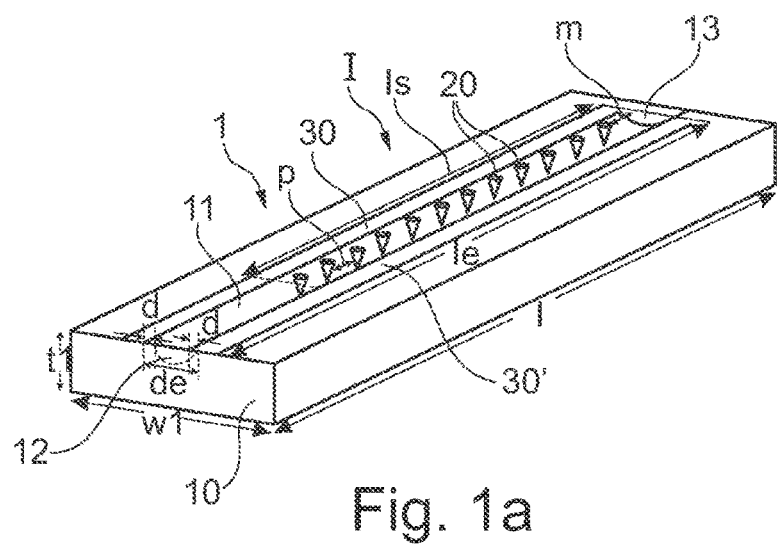
FIG. 1a shows a perspective view of a first preferred embodiment of a waveguide for a waveguide spectrometer according to the present invention with photonic crystal light cones as evanescent field samplers and electrodes on the side of the waveguide resp. guiding core (without photo-detectors and conductors)

FIG. 1a shows a perspective image of a first preferred embodiment of a waveguide 11 of the waveguide spectrometer according to the present invention with photonic crystal light cones 20 as evanescent field samplers. Photonic crystal light cones are conical deformations in the waveguide cladding resp. substrate layer 10 which enables extraction of evanescent field. Photonic crystal light cones can be achieved using e.g. focused ion-beam lithography. The evanescent field samplers are configured to out-couple light from the waveguide 11.

In this first embodiment, the waveguide 11 is extending from an inlet face 12 through a substrate layer 10, along the direction of the length l of the substrate layer 10, to a reflecting element 13 acting as a back-reflecting mirror in order to achieve counter propagation inside the waveguide 11 (so-called Lippmann configuration). In an area of the inscribed surface waveguide 11 written e.g. by a femtosecond pulse laser into the substrate layer 10, the refractive index is changed and differs from the not laser radiated substrate material. Inscribing the waveguide 11 directly within the substrate layer 10 advantageously improves the manufacturing process of the substrate layer 10 with surface waveguides 11 and stacks thereof in a cost effective way. As a further advantage, such manufacturing process by inscribing the waveguide 11 allows direct access to evanescent fields on the smooth surface of the substrate layer 10 required for the light out-coupling means. The substrate layer 10 further shows a substrate width w1 and a substrate height t1.

For reasons of simplicity and better illustrations, the plurality of photo detectors functioning as light sensing units and typically arranged on a front side I of the substrate layer 10 and corresponding conductors for electrical connection of said plurality photo detectors are not shown in FIG. 1a and the following Figures of the present application. In a preferred embodiment, the plurality of photo detectors is directly coupled on the evanescent fields samplers of the waveguide. The photo detector may be in the form of thin film nano-sensors or a standard array.

Alternatively, an image transfer system is placed between the photo detectors and the evanescent field samplers. Moreover, a plurality of such waveguides 11 in a substrate layer 10 may build a spectrometer stack.

Preferably, the substrate layer 10 is realized by, but not limited to, a $LiNbO_3$ crystal. Alternatively, the substrate layer 10 may be realized by other electro-optical materials (having a significantly large Pockels coefficient) allowing manufacturing low loss waveguide, e.g. gallium arsenide (GaAs), lithium niobate ($LiNbO_3$), gallium phosphide (GaP), lithium tantalite ($LiTaO_3$) or quartz. Among them, $LiNbO_3$ is attractive because of its large electro-optic coefficients, large transparency range (0.4 to 4 μm) and wide intrinsic bandwidth.

Figure 1B:
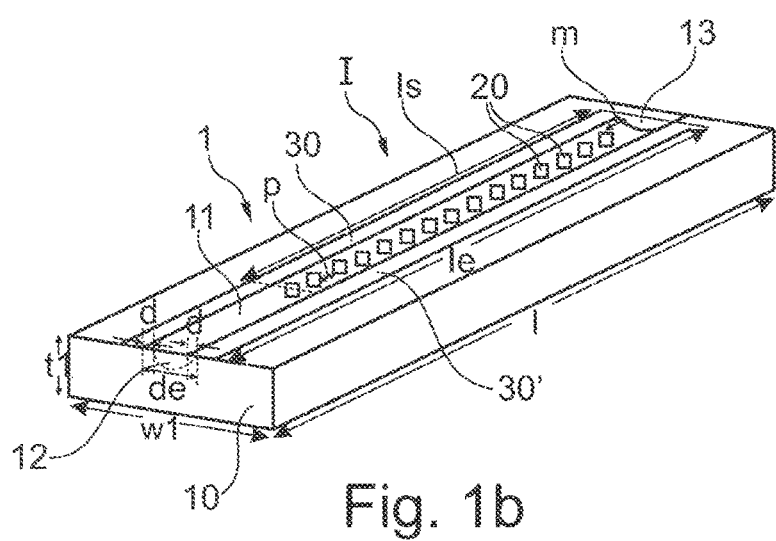
FIG. 1b shows a perspective view of a second preferred embodiment of a waveguide for a waveguide spectrometer according to the present invention with etched grooves as evanescent field samplers.

The evanescent field samplers (e.g. in the form of photonic crystal light cones as shown in FIG. 1a or etched grooves as shown in FIG. 1b) are preferably distanced by a pitch that needs to satisfy Nyquist criterion for spectral sampling in combination with the properties of the material and the detector pixels' size (for case of on-chip deposited detectors) and the image transfer system's image resolvability restricted by diffraction limiting factors (for the case of far-field detectors combined with optics). Typical numbers are comprised in the range, but not limited to, p=1 μm to 20 μm.

Electrodes 30; 30' (i.e. anode and cathode), are placed aside directly neighboured to the guiding core respectively waveguide 11, while the electrodes 30; 30' are functioning, while an electrical voltage is applied as refractive index modulator. A gap de defines the distance between the electrodes 30; 30'. Furthermore, a distance d is defined between the waveguide 11 and each of the electrodes.

Figure 4:
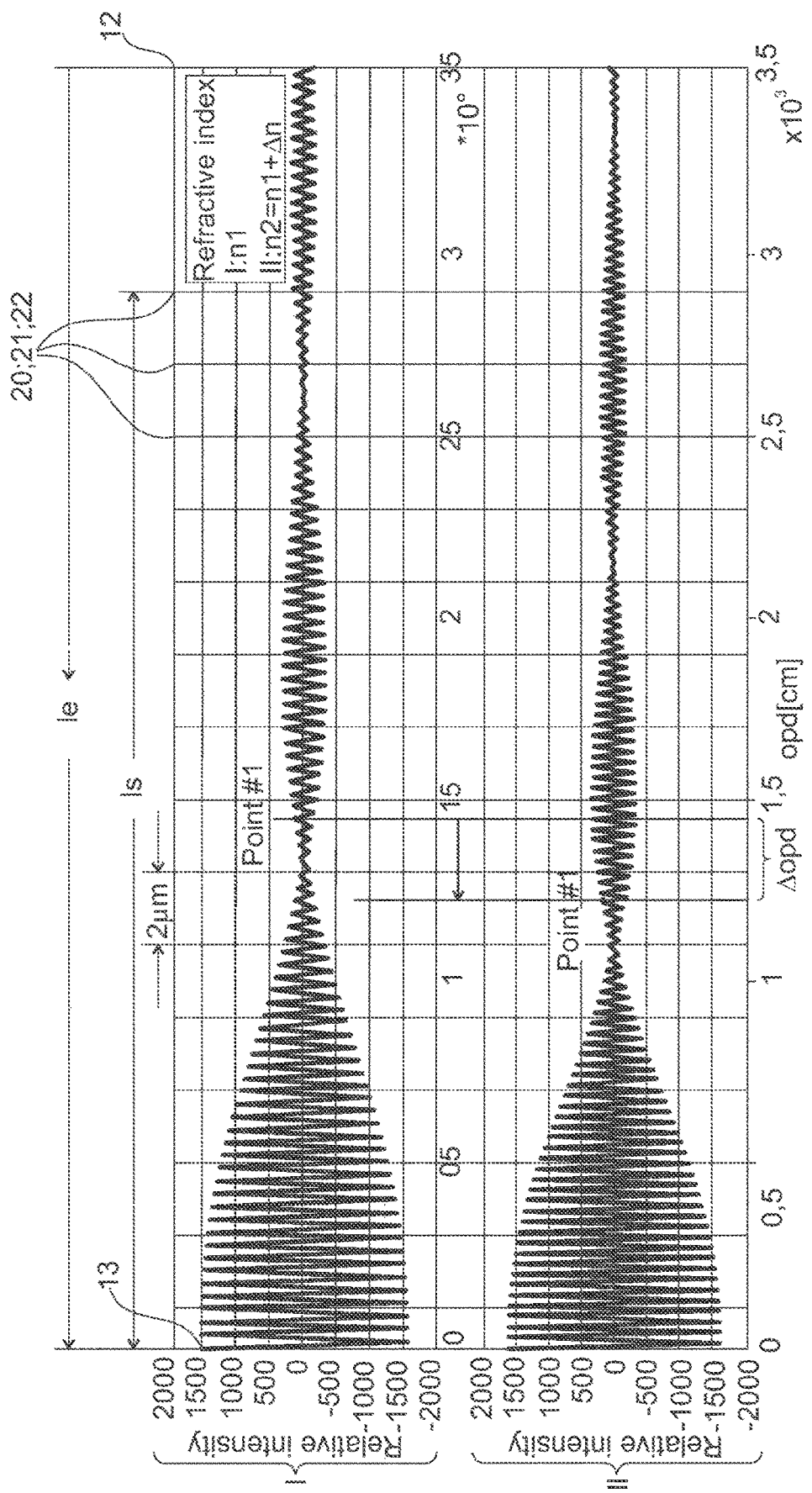
FIG. 4 shows an interferogram corresponding to a polychromatic light generated by a superposition of a forward propagating and a backward propagating wave with and without applying voltage to the electrodes.

In this first preferred embodiment, the electrodes 30; 30' are placed on the top surface towards the front side I of the substrate layer 10. The refractive index of the guiding core respectively the waveguide 11 is known and has a fixed value (n1). As soon as a voltage is applied between the electrodes 30, 30', the refractive index in the waveguide 11 is shifted (n2=n1+Δn), resulting in a shift of the interferogram as illustrated in FIG. 4. This process is reversible, i.e. after voltage is switched off, the reflective index returns to the fixed value n1. The fact that the change of the reflective index can be changed by applying voltage has the advantage that this reversible process can be per-formed fast.

In addition, the integrated modulator is can be configured to compensate for perturbations of the refractive property of the waveguide that may arise from stress, thermal effects or other perturbations.

ls is the length of the sampled interferograms by the evanescent field samplers, while le is the length of the electrodes. The length of the sampled interferograms ls also defines the achievable spectral resolution (e.g. in the NIR at 766 nm, a ls=5 mm gives a spectral resolution of 0.025 nm). The difference between ls an le is a trade-off between minimizing waveguide transmission losses and minimizing possible uncontrolled straying of the light originating from non-perfect light in-coupling into the waveguide 11. Preferebly, difference le−ls can range, without being limited to, from 0 to 10 times ls. The length le of the electrodes essentially corresponds here to the length of waveguide 11.

The first sampler i.e. closest to the reflective element 13 is distanced by distance m to the reflective element 13. Preferably, the first sampler is positioned at a distance m<p from the reflective element, with m as small as technically feasible ideally approaching zero. For example, with focussed ion beam mirror machining, distances m in the range of 50 nm can be reached.

From this point on, the same reference numbers will in the following denote the same components on the figures.

FIG. 1b shows a perspective image of a second preferred embodiment of a waveguide 11 of the waveguide spectrometer according to the present invention which differs from the first preferred embodiment according to FIG. 1a by etched grooves 21 as evanescent field samplers. Etched grooves 21 are deformations in the waveguide cladding resp. substrate layer 10 which enable extraction of evanescent field. Etched grooves 21 can be achieved using e.g. focused ion-beam lithography.

Figure 1C:
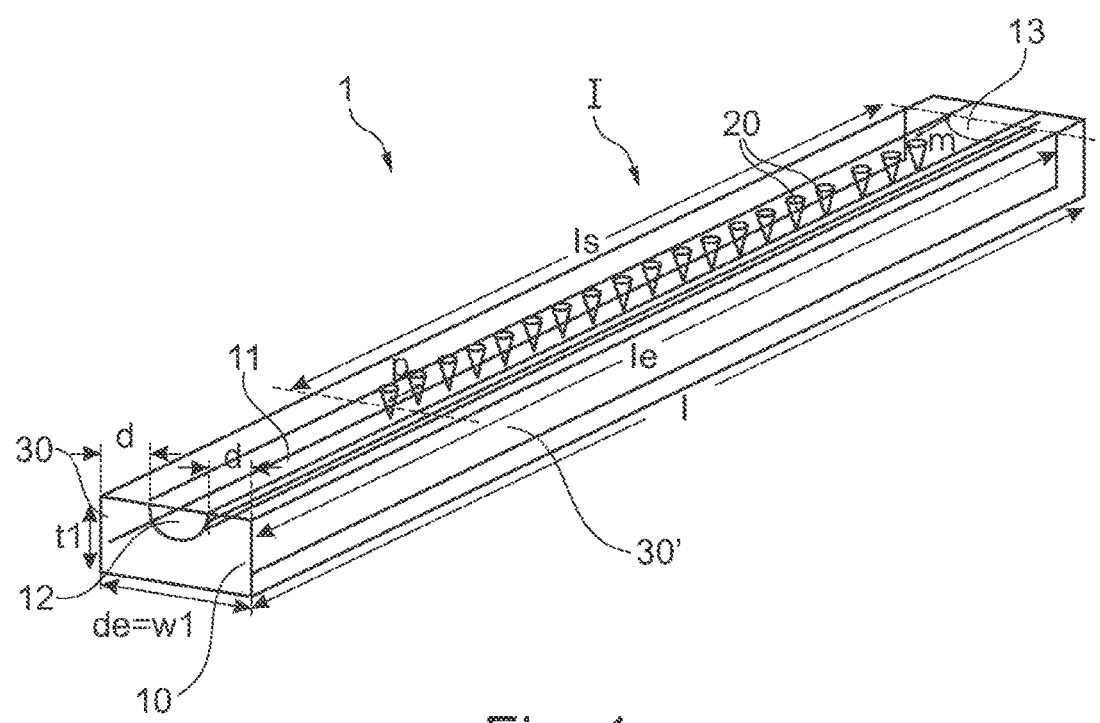
FIG. 1c shows a perspective view of a third preferred embodiment of a waveguide for a waveguide spectrometer according to the present invention wherein electrodes are placed on opposing side faces of the substrate layer.

FIG. 1c shows a perspective image of a third preferred embodiment of a waveguide 11 of the waveguide spectrometer according to the present invention. In this third preferred embodiment, the electrodes 30; 30' are placed on opposing side faces resp. side walls of the substrate layer 10 and proceeding perpendicular to the front side I of the substrate layer 10 along a length le. Furthermore, in this third preferred embodiment, the width w1 of the substrate layer 10 equals the gap de between the electrodes, i.e. de=w1.

Figure 2A:
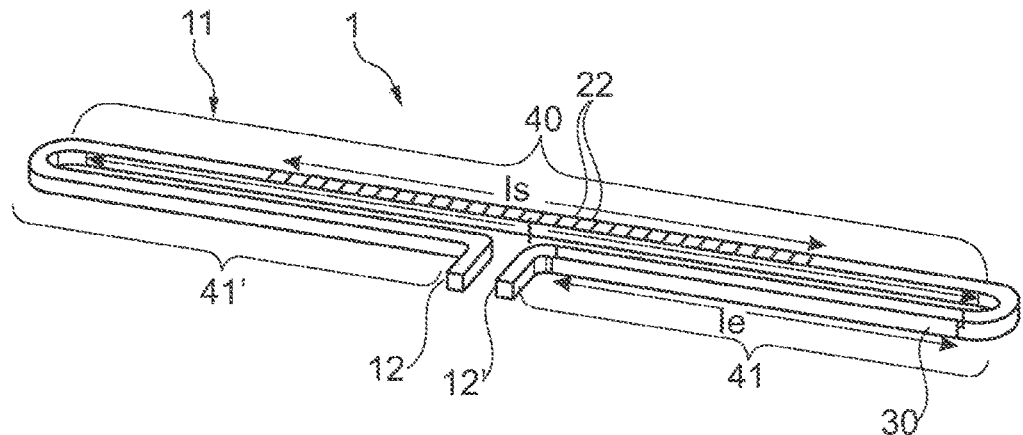
FIG. 2a shows a perspective view of a fourth preferred embodiment of a waveguide for a waveguide spectrometer in a counter-propagative Gabor configuration with metallic nano samplers as evanescent field samplers.

FIG. 2a shows a perspective image of a fourth preferred embodiment of a waveguide 11 of the waveguide spectrometer 1 in a Gabor configuration with bridge-shaped metallic nano sampler 22 as evanescent field samplers. These metallic structures as evanescent field samplers are e.g. plasmonic antennas in the shape of nano-bars whose scattering efficiencies are optimized for the operation bandwidth. The fabrication is through e-beam lithography, sputter coating, two-photon lithography, etc.

In the counter-propagative Gabor configuration as shown in FIG. 2a, means to achieve counter propagating optical signals are comprised by a beam splitting element configured to split the received optical signal into two separate signals guided through two inlet faces 12; 12' into the waveguide 11 in order to achieve counter propagation inside the waveguide 11.

An electrode 30 is placed directly neighboured to the waveguide 11 while another electrode 30' (not visible in FIG. 2a) is placed on opposite sides. In this fourth embodiment of the waveguide 11, the electrodes 30; 30' (i.e. the anode and cathode) are placed at an arm 41 of the two arms 41; 41'. According to the fourth preferred embodiment as shown in FIG. 2a, the electrodes 30; 30' are placed on one arm 41 of the guiding core and not directly on the interferogram. The length of left side arm 41' and right side arm 41 can be equal or unequal. In the latter case, the optical zero path difference (ZPD) is shifted from the centre and this enables physical displacement of the interferogram due to change of refractive index in the waveguide material. The refractive index across the path of light through the arm 41 can be modulated by applying an electrical voltage to the electrodes 30; 30' along the length le. In this configuration, the length of the sampled interferogram ls also defines the achievable spectral resolution. Principally, the length of the electrodes 30; 30' le is a trade-off between optimizing the modulation to be achieved through the electro-optical effect, minimizing waveguide transmission losses and minimizing possible uncontrolled straying of the light originating from non-perfect light in-coupling into the waveguide.

Figure 2B:
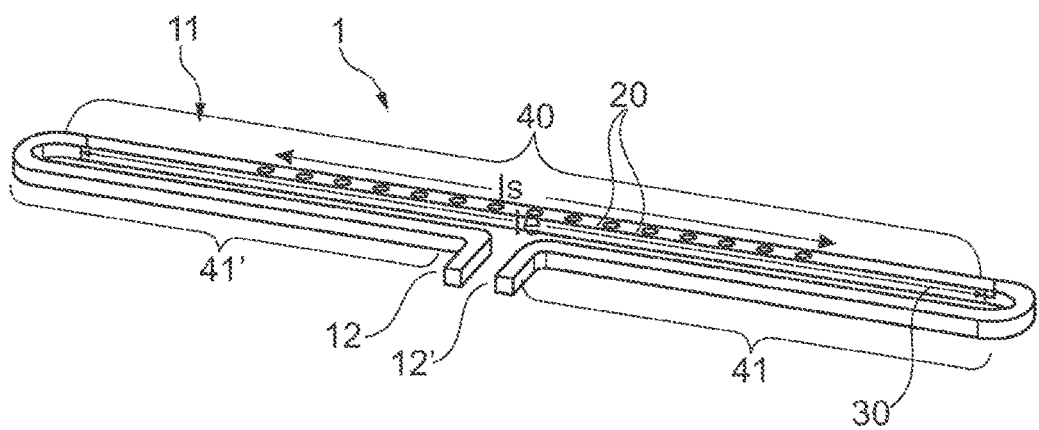
FIG. 2b shows a perspective view of a fifth preferred embodiment of a waveguide for a waveguide spectrometer in a counter-propagative Gabor configuration with engraved diffusers as evanescent field samplers wherein electrodes are placed on opposing side faces of the substrate layer in the area where the interferogram is located.

FIG. 2b shows a perspective image of a fifth preferred embodiment of a waveguide 11 of the waveguide spectrometer in a Gabor configuration with engraved diffusers in the form of photonic crystal light cones 20 as evanescent field samplers.

According to this fifth preferred embodiment, the electrodes 30; 30', i.e. the anode and cathode (30' not visible in FIG. 2b), are placed on opposite sides directly on the waveguide arm 40.

Figure 3A:
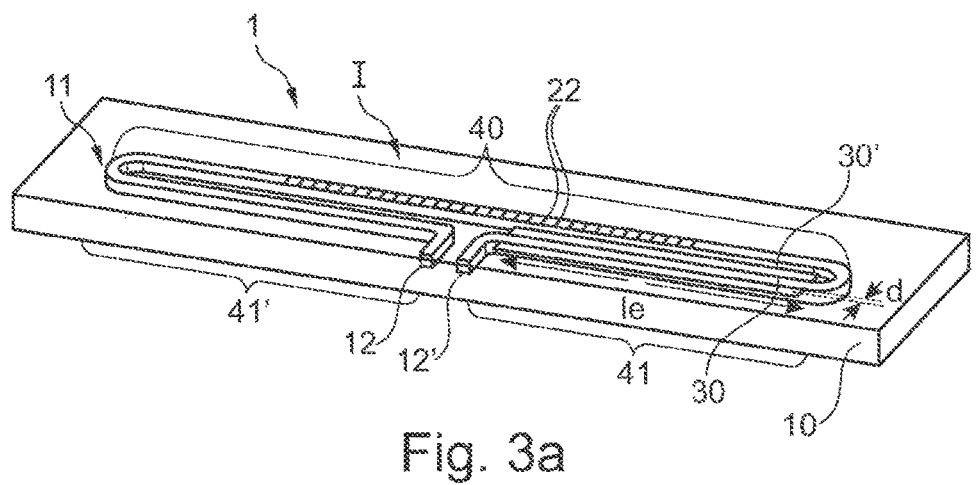
FIG. 3a shows a perspective view of a sixth preferred embodiment of a waveguide for a waveguide spectrometer in a counter-propagative Gabor configuration with metallic nano samplers as evanescent field samplers.

FIG. 3a shows a perspective image of a sixth preferred embodiment of a waveguide 11 of the waveguide spectrometer according to the present application in a Gabor configuration with a plurality of metallic nano samplers as evanescent field samplers.

The waveguide 11 may be written in the substrate layer 10 e.g. by a femto-second pulse laser.

Figure 3B:
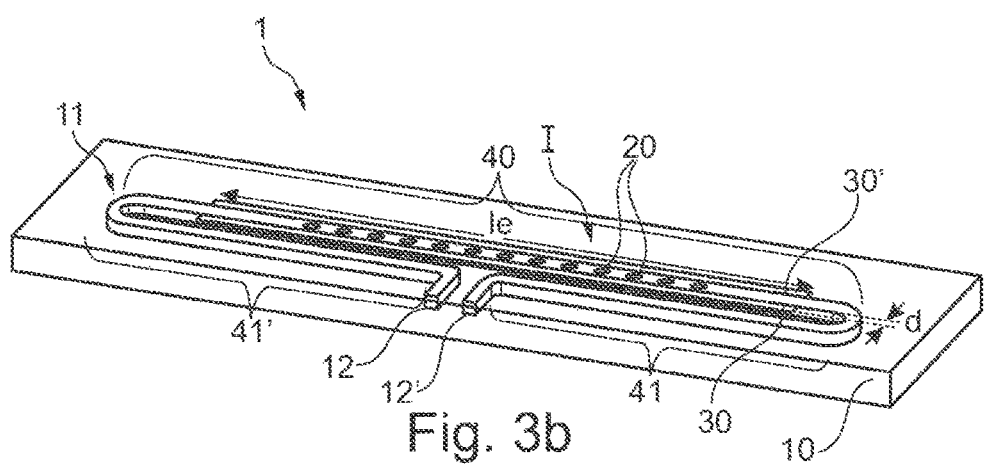
FIG. 3b shows a perspective view of a seventh preferred embodiment of a waveguide spectrometer in a counter-propagative Gabor configuration with engraved diffusers as evanescent field samplers written in the substrate layer.

FIG. 3b shows a perspective image of a seventh preferred embodiment of a waveguide 11 of the waveguide spectrometer according to the present application in a Gabor configuration with engraved diffusers in the form of photonic crystal light cones 20 as evanescent field samplers written in the substrate layer 10.

According to this seventh preferred embodiment, the electrodes 30; 30' (i.e. anode and cathode), can be placed on the surface of the front side I of the substrate layer 10.

FIG. 4 shows an interferogram corresponding to a polychromatic light generated by a superposition of a forward propagating and a backward propagating wave with (II) and without (I) applying voltage to the electrodes leading to a change of the refractive index exemplified in an $LiNbO_3$ crystal using a waveguide according to one the preferred first to third embodiments as shown in FIG. 1a to 1c.

In (II) where voltage is applied to the electrodes, a change of the refractive index $\Delta n$ is achieved varying the effective optical path difference $\Delta opd$ of the interferogram. As indicated in FIG. 4, the reflective surface realised by the reflective element 13 is located on the left at an optical path difference (opd)=0 cm. The wave propagates through the inlet face 12 from the right hand side to the reflective element 13, is reflected and forms a standing wave in the waveguide 11.

In Lippmann configuration where a forwarding wave is back-reflected on one side of the waveguide and the reflective surface is located (at zero OPD), the interferogram is squeezed (in general terms modulated/deformed, i.e. squeezed, displaced or expanded) in front of the fixed samplers (i.e. photonic crystal light cones 20, etched grooves 21, metallic nano samplers 22) allowing interferogram scanning.

In summary, the innovative solution is to scan the interferogram below a fixed samplers' configuration by taking advantage of electro-optical effect/thermal effect of specific waveguide material within the waveguide 11 itself. This is done by varying the index of refraction of waveguide module (e.g. $\Delta n=0.4$ according to FIG. 4) which is hosting the interferogram by application of an electric field. The electric field is created by applying voltage to the electrodes embedded in the waveguide spectrometer device. The change in the refractive index of the waveguide 11 changes the effective optical path length which results in expansion/squeeze (i.e. modulation) of the interferogram and its displacement along the optical path by $\Delta opd$ (see FIG. 4). In principle, this phenomenon can be interpreted as the parade of an interferogram generated by a forward propagating and a backward propagating wave in front of the interferogram samplers which are in an immovable configuration.

LIST OF REFERENCE NUMERALS

1 Waveguide spectrometer
  10 Substrate layer
  11 Surface waveguides
  12, 12' Inlet/in-coupling waveguide face
  13 Reflecting element with reflecting surface
  20 Photonic crystal light cone
  21 Etched groove
  22 Metallic nano sampler
  30; 30' Electrodes
  40 Main waveguide arm (of the interferometer)
  41; 41' Arm (of the interferometer)
  d Distance between each of the electrodes and the waveguide
  de Gap between electrodes
  I Front side (of the substrate layer)
  ls Length of sampled interferogram (by evanescent field samplers)
  le Length (electrodes)
  l Substrate length
  m Distance between reflective surface and first sampler
  p Pitch (between evanescent field samplers)
  t1 Substrate height
  w1 Substrate width

The invention claimed is:

1. A Waveguide Spectrometer to carry out integrated interferogram scanning, comprising:
   a substrate layer with a waveguide, the waveguide extending from an inlet face and configured to guide received light,
   at least one evanescent field sampler in the waveguide, configured to out-couple light out from the waveguide,
   at least one light sensing unit configured to detect the out-coupled light, each electrically connected to an electronic read out system, and
   means to achieve counter propagating optical signals inside the waveguide configured to obtain interference between the counter propagating optical signals generating an interference pattern along the waveguide in an interferogram,
   wherein
   the waveguide spectrometer comprises an integrated modulator configured to enable conditioning of the guided optical signals and configured for changing the refractive index, wherein said integrated modulator is realised by electrodes placed aside directly neighboured to the waveguide on the substrate next to the waveguide generating an optical phases shift required for modulating the interferogram and wherein a distance between the waveguide and each of the electrodes is d>0 mm.

2. The Waveguide Spectrometer according to claim 1, wherein the Waveguide Spectrometer comprises a reflecting element, wherein the waveguide is extending from an inlet face through the substrate layer to a reflecting element in order to achieve a Lippmann configuration.

3. The Waveguide Spectrometer according to claim 1, wherein the means to achieve counter propagating optical signals comprises a beam splitting element configured to split the received optical signal into two separate signals guided through two inlet faces into the waveguide in order to achieve counter propagation inside the waveguide in a Gabor configuration.

4. The Waveguide Spectrometer according to claim 1, wherein the electrodes are placed on the top surface towards the front side of the substrate layer aside the waveguide and proceeding on the top surface along a length.

5. The Waveguide Spectrometer according to claim 1, wherein the electrodes are placed on opposing side faces of the substrate layer aside the waveguide and proceeding perpendicular to the front side of the substrate layer along a length.

6. The Waveguide Spectrometer according to claim 1, wherein the at least one evanescent field sampler in the waveguide are at least one of photonic crystal light cones, etched grooves, and a metallic nano sampler.

7. The Waveguide Spectrometer according to claim 1, wherein the waveguide is directly inscribed into the substrate layer.

8. The Waveguide Spectrometer according to claim 1, wherein the integrated modulator uses the electro-optic effect to achieve modulation of the refractive index property.

9. The Waveguide Spectrometer according to claim 1, wherein the waveguide structure material contains $LiNbO_3$, and wherein the index modulator is implemented directly on the $LiNbO_3$.

10. A method for manufacturing the Waveguide Spectrometer according to claim 1, the method comprising:

inscribing the surface waveguide in the substrate layer with a laser beam in direction of the length of the substrate layer, placing the at least one evanescent field sampler into the waveguide, configured to out-couple light out from the waveguide, positioning the means to achieve counter propagating optical signals inside the waveguide configured to obtain interference between the counter propagating optical signals generating an interference pattern along the waveguide, positioning the at least one light sensing unit configured to detect the out-coupled light connecting each electrically to the electronic read out system.

* * * * *